US005337561A

United States Patent [19]

Raghavan et al.

[11] Patent Number: 5,337,561

[45] Date of Patent: Aug. 16, 1994

[54] ULTRA HIGH PRESSURE MULTIPLE INTENSIFIER SYSTEM

[75] Inventors: Chidambaram Raghavan; Kraig T. Kostohris, both of Kent; Adrain C. O. Hawes, Seattle, all of Wash.

[73] Assignee: Flow International Corporation, Kent, Wash.

[21] Appl. No.: 977,659

[22] Filed: Nov. 17, 1992

[51] Int. Cl.$^5$ .................... F16D 31/02

[52] U.S. Cl. .................... 60/421; 60/426; 60/428; 60/452; 91/517

[58] Field of Search .................... 60/420, 421, 426, 428, 60/429, 430, 431, 445, 450, 452, 468, 494; 91/517, 518

[56] References Cited

U.S. PATENT DOCUMENTS

| | | | |
|---|---|---|---|
| 1,412,069 | 4/1922 | Stevenson . | |
| 3,669,572 | 6/1972 | King . | |
| 3,811,795 | 5/1974 | Olsen . | |
| 4,055,046 | 10/1977 | Schexnayder | 60/428 |
| 4,073,141 | 2/1978 | Lohbauer | 60/421 |
| 4,162,874 | 7/1979 | Marietta | 60/428 X |
| 4,368,008 | 1/1983 | Budzich . | |
| 4,776,769 | 10/1988 | Hilaris . | |
| 4,780,064 | 10/1988 | Olsen . | |
| 4,838,756 | 6/1989 | Johnson et al. | 60/429 X |
| 5,048,293 | 9/1991 | Aoyagi | 60/428 X |
| 5,092,744 | 3/1992 | Boers et al. . | |
| 5,176,504 | 1/1993 | Moriya et al. | 60/428 |

FOREIGN PATENT DOCUMENTS

| | | | |
|---|---|---|---|
| 2251961 | 7/1992 | United Kingdom | 60/421 |

*Primary Examiner*—Edward K. Look
*Assistant Examiner*—Hoang Nguyen
*Attorney, Agent, or Firm*—Hughes & Multer

[57] ABSTRACT

An improvement in a multiple intensifier system having two intensifier units with reciprocating piston assemblies to supply very high pressure water. When one of the piston assemblies travels faster than the other, so that these reached an end stroke position at the same time, there can be an abrupt pressure drop. To alleviate this, a first embodiment isolates the compensator control lines of the pumps of the two intensifier units so as to maximize volumetric flow rates during such pressure drops to give the slower moving piston assembly a boost at the beginning of its subsequent stroke. Another embodiment provides an accumulator in the fluid control line for the compensators, and a further embodiment provides a pressure reference supply pump to alleviate pressure variations in the fluid control line.

10 Claims, 9 Drawing Sheets

ATTENUATOR PRESSURE

LINE PRESSURE IN PUMP 14c

VOLUME OF FLOW FROM PUMP 14c

LINE PRESSURE IN PUMP 14d

VOLUME OF FLOW FROM PUMP 14d

ULTRA HIGH PRESSURE MULTIPLE INTENSIFIER SYSTEM

FIELD OF THE INVENTION

The present invention relates to a ultra high pressure multiple intensifier system and method, and more particularly to such a system which, among other things, maintains the intensifiers in proper phased relationship so that the intensifiers do not reach the end of their stroke at the same time, thus avoiding more severe pressure drops in the output for the intensifiers.

BACKGROUND ART

In recent decades, ultra high pressure intensifiers have been used for a variety of industrial purposes. These intensifiers pressurize water to as high as 30,000 to 60,000 PSI or higher, and the water is often discharged as a high velocity water jet to accomplish such operations as cutting or abraiding material. A common configuration of such an intensifier comprises a piston assembly where there is a larger diameter center piston, and two smaller high pressure pistons extending oppositely from the center piston, with these being enclosed in a suitable cylinder housing. High pressure hydraulic fluid is directed into the larger cylinder containing the center piston to reciprocate the piston assembly back and forth, and the smaller diameter high pressure pistons alternately pump water at very high pressures to one or more orifices (or other output) through which the high pressure water is discharged.

When the piston assembly reaches one end of its stroke, there is a short period of time (e.g. 60 milliseconds) before it starts reversing direction. Then, since water at these very high pressures becomes compressed by as much as fifteen percent, it can take as much as about another 100 milliseconds or so to precompress the water in the cylinder to the operating pressure. Thus, at the end of one stroke of the piston and during the initial compression phase of the stroke, there is a pressure dip in the output. This can be compensated for partially by use of an accumulator.

When two intensifiers are utilized in parallel relationship to deliver high pressure water to the same output, if the intensifiers are operating out of phase, so that one intensifier is on its power stroke while the other one is changing direction, this can help to alleviate the problem of the pressure dips. On the other hand, if the two intensifiers have their piston assemblies reaching the end of a stroke at the same time, the effect of the pressure dip can be rather severe and impair the effective of operation of the system.

Even though two ultra high pressure intensifiers are substantially identical models, under the same operating conditions, each will operate at a slightly different frequency. For example, over a period of time one intensifier may develop a certain amount of leakage around the seals, valves, etc. and this could change its operating frequency. As a practical matter, when the intensifiers are operated to provide a common output, the pressures developed by the two intensifiers should be substantially the same (requiring that the intensifiers would have a common reference pressure by which to operate), and this places certain constraints on the phase control devices that would be practical.

SUMMARY OF THE INVENTION

The present invention is an apparatus and method relating to an improvement for a multiple high pressure fluid intensifier system.

The type of system for which the improvement of the present is adapted comprises at least first and second intensifier units, each of which comprises a piston assembly that in turn comprises a main piston and two high pressure pistons. Each piston assembly is mounted for reciprocating motion to cause its two high pressure pistons to alternately deliver high pressure output fluid through output means of the intensifier unit. There are first and second pump means operatively connected to the first and second intensifier units, respectively, to deliver pumping fluid to the first and second intensifier units, respectively.

To control the flow of the pump fluid to the first and second intensifier units, there are provided first and second control valve means, respectively, to cause said piston assemblies of the first and second intensifier units to reciprocate.

Additionally, there are first and second compensator means operatively connected to the first and second pumps, respectively. Each of the compensator means is responsive to a reference pressure and also responsive a pressure of its related pump means. Each compensator causes its related pump means to increase or decrease volumetric flow from its pumps means in response to a difference between said reference pressure and said pump pressure.

There is attenuator output means adapted to receive pressurized fluid from said first and second intensifier units in a manner to provide a fluid back pressure to the intensifier units. Also, there is a pressure reference means to provide the reference pressure for the first and second attenuator means.

This intensifier for which the improvement of the present invention is adapted is characterized in that the piston assemblies of the first and second intensifier units experience a back pressure from said attenuator output means that is reacted back to said first and second pumps, and also characterized in that the piston assemblies experience a drop in pressure in transitioning from an end of one stroke into a start of another stroke.

The improvement of the present invention comprises a means operatively connected to the pressure reference means and to the first and second compensator means to maintain pressure reference inputs to the first and second compensator means at an adequately high level relative to operating pressures of the first and second pump means in a manner that the first and second compensator means respond to pressure differentials between the reference pressure inputs and the pump pressures to cause the first and second pump means to operate at higher volumetric flow rates during periods of the first and second intensifier units reaching an end stroke position and entering into a subsequent stroke.

In a first embodiment, this improvement comprises first and second check valve means operatively positioned between the pressure reference means and the first compensator means and between the pressure reference means and the second compensator means, respectively. This is done in a manner to permit flow from the first and second compensator means, respectively, towards said pressure reference means, and to prevent flow in an opposite direction. This serves to isolate each of the compensator means from pressure drops of the pump means operatively connected to the other compensator means.

As a further improvement, there are first and second adjustable needle valve means operatively positioned between the first compensator means and the pressure reference means and between the second compensator means and the pressure reference means, respectively. Each of the first and second needle valve means is selectively adjustable to control flow from the first and second compensator means, respectively, towards said pressure reference means.

A second embodiment of the present invention comprises the accumulator means connected to hydraulic line means interconnecting the first compensator means and the pressure reference means and also interconnecting the second compensator means with the pressure reference means to reduce pressure fluctuations between the first compensator means and the pressure reference means and between the second compensator means and the pressure reference means.

A third embodiment comprises pressure reference pump means to supply pressure reference fluid between said first compensator means and said pressure reference means and said compensator means and said pressure reference means to alleviate pressure fluctuations.

In the method of the present invention, there is a multiple high pressure fluid intensifier system as described above. At such time as one of the piston assemblies reaches an end of one stroke and is beginning a return stroke, there is a pressure reduction in the pump means of that intensifier unit. To alleviate adverse effects of this pressure reduction of that pump means in causing a modification of applied reference pressure in the overall system, the method of the present invention comprises maintaining pressure reference inputs to both the first and second compensator means at an adequately high level relative to operating pressures of the first and second pump means in a manner that the first and second compensator means responds to pressure differentials between the reference pressure inputs and the pump pressure of the first and second pump means. This causes the first and second pump means to operate at higher volumetric flow rates during periods of the piston assemblies of the first and second intensifier units reaching an end of stroke position and entering into a subsequent stroke.

In a first embodiment of the method of the present invention, this is accomplished through check valve means by isolating the first and second compensator means from pressure fluctuations in pressure reference hydraulic line means.

As an improvement to the method of the first embodiment, the fluid flow from each of said first and second compensator toward said pressure reference means is selectively controlled as a means of regulating the velocity of one or the other of said piston assemblies.

In the method of the second embodiment, pressure variations in the hydraulic line means interconnecting the two compensator means and the pressure reference means are alleviated by applying accumulator means to the hydraulic line means to enable the accumulator means to respond to such pressure variations and alleviate the same.

The method of the third embodiment is to supply pressure reference fluid between the first compensator and the pressure reference means and between the second compensator means and the pressure reference means to alleviate the pressure fluctuations.

Other features of the present invention will become apparent from the following detailed description.

DESCRIPTION OF THE PREFERRED EMBODIMENTS

It is believed that a clearer understanding of the present invention will be achieved by first describing generally how a single high pressure intensifier system operates, and then discussing the problems of incorporating these in a dual intensifier system, after which the embodiments of the present invention will be described.

a. Design and Operation of a Single Prior Art High Pressure Intensifier

Figure 1:
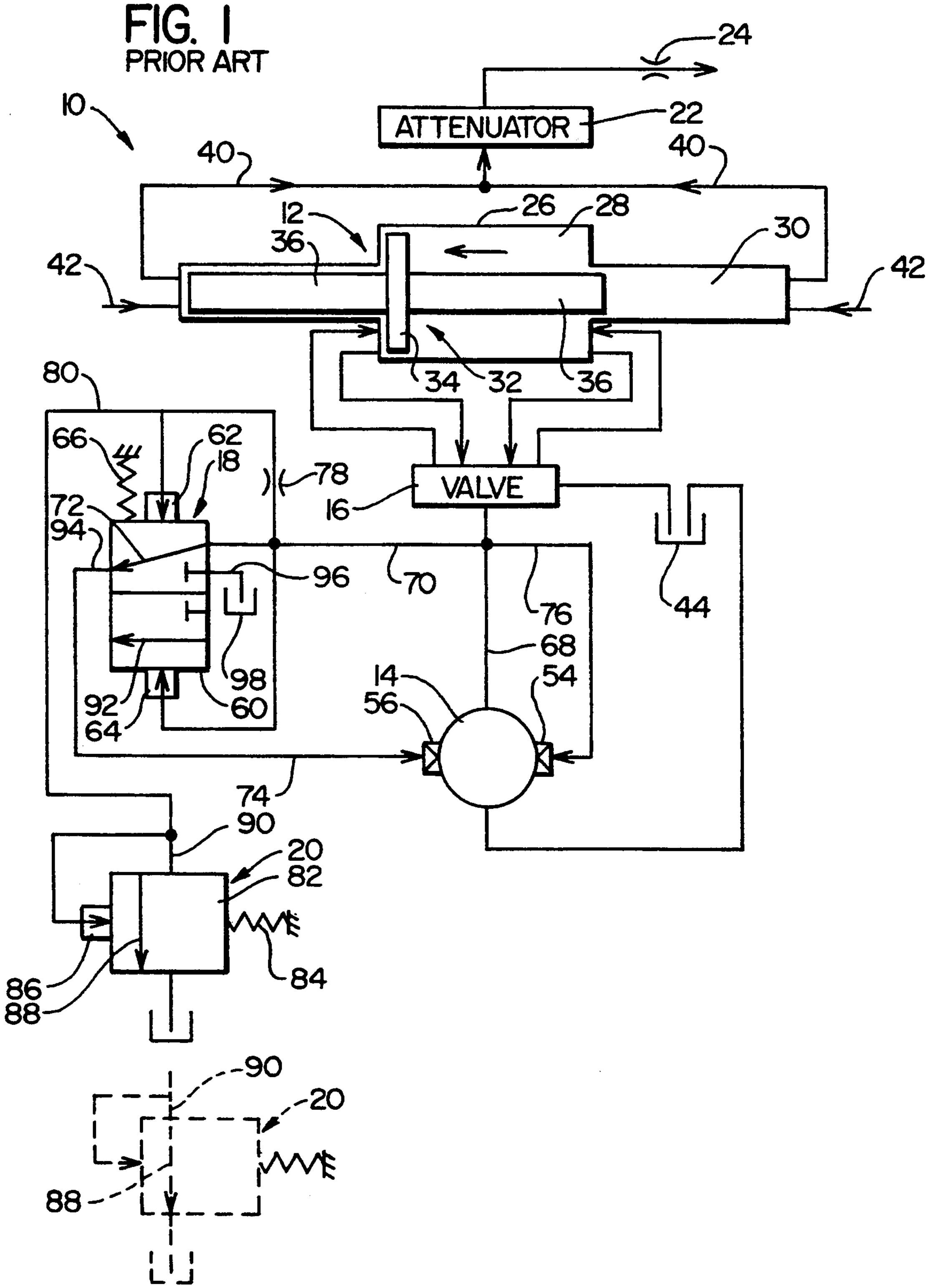
FIG. 1 PRIOR ART
FIG. 1 is a schematic view of a prior art ultra high pressure system using only a single intensifier unit and a single pump, along with their associated components.

FIG. 1 shows schematically a typical prior art single high pressure intensifier system 10. The system 10 comprises an intensifier unit 12, a pump 14 that drives the unit 12, a valve 16 that directs the hydraulic fluid from the pump 14 to the intensifier unit 12, a compensator 18 that controls the volumetric flow of the pump 14 to attempt to match a predetermined pressure level, and a reference pressure member in the form of a relief valve 20 that is set to control the output pressure of the flow of hydraulic fluid from the pump 14. Also, there is an attenuator 22 which receives the high pressure fluid from the intensifier apparatus 12 and a fluid output nozzle means 24.

Figure 2:
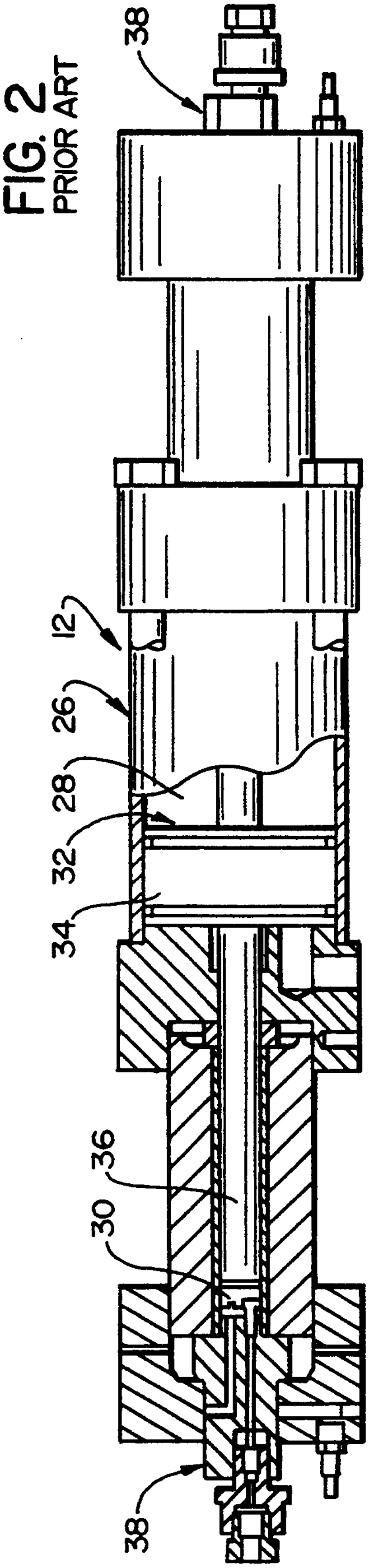
FIG. 2 PRIOR ART
FIG. 2 is a longitudinal sectional view of a typical intensifier unit used in the present invention.

Each of these components will be described briefly, after which there will be a description of the overall operation of this system 10. A prior art intensifier unit 12 which is or may be used in the present invention is shown in FIG. 2. In general, this intensifier unit 12 comprises a housing 26 that defines a main central cylinder 28 of a larger diameter and two high pressure cylinders 30 on opposite sides of the cylinder 28. There is a piston assembly 32 comprising a central piston 34 of larger diameter, and two high pressure end pistons 36 extending oppositely from the central piston 34. At opposite ends of the housing 26 are two valve assemblies 38 that permit the outflow of high pressure fluid (generally water) from each end cylinder 36 on the power stroke, and the inflow of water or other liquid into the cylinder 36 on the intake stroke.

In operation, high pressure hydraulic fluid is pumped alternately into the central cylinder 28 on opposite sides of the central piston 34 to reciprocate the piston assembly 32 back and forth within the housing 26. This in turn causes a discharge of very high pressure water from the end cylinders 36 alternately.

In FIG. 1, there is shown two output lines 40 extending from the outer ends of the end cylinder 36 and leading to the attenuator 22, and two water inlet lines 42. It is to be recognized that when the piston assembly 32 reaches one end of its stroke, there is a short lapse of time before the piston assembly 32 begins traveling in the opposite direction. Also, at the very high pressures at which the intensifier assembly 12 is operating (water pressures as high as 55,000 PSI or possibly higher, and hydraulic fluid pressures in the main central cylinder 28 being as high as 2700 to 2800 PSI or higher), the water itself will compress to as much as 15% of its original volume before reaching a pressure of 55,000 PSI. Thus, an the end of each stroke of the piston assembly 32, there is a dip in the output pressure. The attenuator 22 comprises an accumulator which compensates for these pressure fluctuations to some extent. For example, this accumulator 22 could be a flexible diaphragm which is pressurized on one side by a very high pressure gas, and this diaphragm would react to the pressure fluctuations in the fluid from the intensifier unit 12 to reduce the pressure fluctuations.

The high pressure fluid from the attenuator 22 is shown going to a nozzle means 24. A typical nozzle 24 would be , for example, an orifice (or orifices) having a relatively small diameter (one to two hundredths of an inch) that would discharge the high pressure water at a velocity of as high as, for example, 3,000 feet per second, or possibly higher.

The aforementioned valve 16 is or may be of conventional design, so it will not be described in detail herein. This valve 16 functions to feed the hydraulic fluid from the pump 14 alternately into the opposite ends of the main central cylinder 28, and return the fluid from the intensifier to a sump 44 from which the hydraulic fluid is returned to the pump 14 to again be directed to the intensifier assembly 12 through the valve 16.

Figure 3:
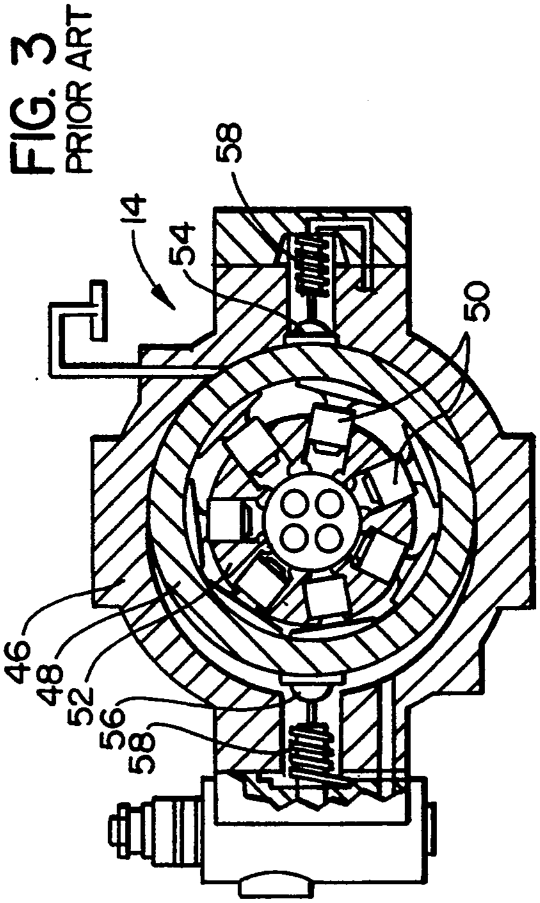
FIG. 3 PRIOR ART
FIG. 3 is a sectional view of a variable output radial pump used in the present invention, this sectional view being taken transverse to the axis of rotation.

The pump 14 is in this present embodiment a prior art radial piston pump, such as shown in FIG. 3, which is a sectional view taken transversely of the axis of rotation of the pump 14. This pump 14 comprises a pump housing 46 in which is positioned a stroke ring 48, that is movable a short distance laterally to adjust the length of the stroke of a set of radial pistons 50 that are mounted within the ring 48 in a rotating cylinder block 52. The central axis of rotation of the cylinder block 52 is stationary relative to the pump housing 46. The volumetric flow of the pump 14 is controlled by moving the stroke ring 48 laterally. As shown in FIG. 3, the stroke ring 48 is in its furthest lateral position where the volumetric flow is the greatest. By moving the stroke ring 48 laterally from this position, the volumetric flow per revolution from the pump will diminish.

The positioning of the stroke ring 48 is controlled by right and left control pistons 54 and 56 that are responsive to respective hydraulic pressure inputs. Also, there are strong centering springs 58 on opposite sides of the stroke ring 48 which tend to locate the stroke ring 48 in an appropriate central operating position. The positioning of the stroke ring 48 of the pump 14 is determined by the compensator 18 and the pressure relief valve 20.

The compensator 18 is shown somewhat schematically in FIG. 1, and it comprises a valve element 60 which is movable between two positions, which are upper and lower positions in accordance with the orientation of FIG. 1. Hydraulic control pistons are provided in the upper and lower ends of the valve element 60, these being shown at 62 and 64, respectively. In addition, at the upper end of the valve element 60 there is a compression spring 66 which exerts a moderate force to move the valve element to its down position where the valve element 60 is positioned as shown in FIG. 1.

In the position of FIG. 1, the valve element 60 directs hydraulic pressure from the high pressure outlet line 68 of the pump 14 through the line 70, through the passageway 72 in the valve element 60, and thence through the line 74 to the left hand control piston 56. Also, hydraulic pressure from the line 68 is directed through the line 76 to the right hand pump control piston 54. The effective cross sectional area of the control piston 56 is somewhat larger than that of the right hand control piston 54 so that with the valve element 60 in the position of FIG. 1, the stroke ring 48 will be positioned to produce a desired volumetric flow rate. In a typical high pressure intensifier capable of producing a flow of, for example, very high pressure water (55,000 PSI), the target volumetric flow from the pump 14 could be approximately 20 gallons per minute. However, the pump 14 is capable of producing a higher volumetric flow by moving the stroke ring 48 of the pump 14 to its furthest right position as shown in FIG. 3. In the particular embodiment shown herein, the maximum volumetric flow rate is approximately 50% greater (i.e. 30 gallons per minute) than the target flow rate (i.e. about 20 gallons per minute in this particular example.)

In the operation of the system 10, the pump 14 operates at a constant rotational speed (in this preferred embodiment 1750 revolutions per minute). Only the volumetric flow rate of the pump is changed or controlled to attempt to provide a substantially constant hydraulic pressure when the piston assembly 32 is moving through its pressure stroke. These specific operating parameters are given simply by way of example, and obviously could vary from these valves.

The pressure control line 70 also provides the pressure through a flow control orifice 78 to provide hydraulic pressure for the upper compensator valve control piston 62. In addition, the flow control line 70 connects to a line 80 that leads to the aforementioned pressure reference valve 20.

The reference valve 20 is (as indicated previously) a pressure relief valve and comprises a valve element 82 which, as shown in FIG. 1, is urged by an adjustable compression spring 84 to its flow blocking position. However, when the pressure in the line 80 increases to a pressure level determined by the setting of the spring 84, it acts on a control piston 86 to move the valve element 82 to the right so as to align the flow through passageway 88 in the valve element 82 with the outlet 90 of the line 80 to permit flow through the valve element 82.

At this point, the basic operation of the compensator 18 will be reviewed, after which the operation of the compensator 18 will be analyzed further in light of the overall operation of the intensifier system 10.

For the moment, let us assume that the piston assembly 32 is in the middle of its stroke, and the pump 14 is delivering substantially the same volumetric flow rate and the pressure in the output line 68 is substantially constant. Also, let it be assumed that the pressure in the output line 68 from the pump 14 is below the desired level (e.g. 2750 PSI). The main flow from the pump 14 is from the line 68, and through the control valve 16 to reciprocate the piston assembly 32. However, a small amount of the flow from the pump 14 (e.g. a gallon per minute) will be diverted through the pressure control valve 70, through the line 80 and down to the pressure relief valve 20. When the valve element 60 of the compensator 18 is in its down position, as shown in FIG. 1, the control pressure in the line 74 exerted through the control piston 56 will be sufficient to overcome the pressure in the right control piston 54 to move the stroke ring 48 of the pump 14 toward its furthest lateral position so as to increase the volumetric flow from the pump 14.

As the volumetric flow from the pump 14 increases, this will tend to move the piston assembly 32 more rapidly to increase the flow rate of very high pressure water from the intensifier unit 12, and this in turn increases the back pressure. This back pressure will in turn be transmitted back to the system to increase the pressure in the output line 68, and thus increase the pressure directed through the control line 80 to the pressure relief valve 20. When this pressure reaches a sufficiently high level, this will cause the pressure relief valve 20 to open. At this instant, the pump 14 would be delivering hydraulic fluid at a slightly greater volumetric flow rate than the target rate, and thus, the pressure in the lower compensator control piston 64 will become slightly greater than that in the upper compensator control piston 62.

This in turn will cause the compensator valve element 60 to move toward its upper position, and will align the lower valve passageway 92 with the inlet end 94 of the line 74 and also to align the passageway 92 with a line 96 leading to a low pressure sump 98. The effect of this would be to drop the pressure in the line 74 and thus reduce the pressure in the pump control piston 56 and in turn cause the stroke ring 48 of the pump 14 to move to the left toward a position where there is lower rate of volumetric flow from the pump 14. This lower volumetric flow will thus decrease the speed of the piston assembly 32, and result in a lower back pressure and thus cause a pressure reduction in the line 68 (and consequently also in the pressure control line 70). When the pressure in the line 70 drops, this causes a pressure reduction also in the line 80, and at a certain level, the pressure relief valve 20 will close.

Now pressure will again build slightly up in the line 80 until the pressure in the upper and lower compensator valve control pistons 62 and 64 become more nearly balanced, and the valve element 60 will then move to its down position, as shown in FIG. 1. When this happens, the fluid pressure in the line 70 will be communicated through the valve passageway 92 through the line 74 to the left pump control piston 56 and start moving the stroke ring 48 toward its maximum volumetric flow rate position. As indicated above this will in turn raise pressure in the line 68 to again increase the pressure in the lower compensator valve control piston 64 to tend to move the compensator valve 18.

It can readily be seen from the above description that the system reaches a equilibrium position, where the pressure relief valve 20 is moving between its open and closed positions, and also the control valve element 60 of the compensator 18 is moving between its two positions to keep the pressure in the line 68 substantially constant.

At this time, it is important to note that the description given above relative to the operation of the compensator 18 and pressure relief valve 20 are under conditions where the piston assembly 32 is moving through one of its pressure strokes, and the back pressure provided by the orifice means 24 is substantially constant. However, there are other aspects of the operation which come into play when the piston assembly 32 reaches an end limit of travel and then starts it stroke in the opposite direction.

Before describing this phase of the operation further (i.e. what happens when the piston assembly 32 reaches its end limit of travel), it should be understood that the pump 14 itself generates its own control pressure. To explain this further, let it be assumed that the pressure relief valve 20 is set to open at 2,750 PSI, and let us further assume that the pump 14 has just been started and that there is no hydraulic pressure in the system. Under these circumstances, the compensator valve element 60 will be in its down position, as shown in FIG. 1. Further, with no hydraulic pressure acting on the pistons 54 and 56, the centering springs 58 on opposite sides of the pump stroke ring 48 will maintain the stroke ring 48 in a desired intermediate position so that the volumetric flow rate from the pump 14 will be rather close to the desired volumetric flow rate.

When the pump 14 initially begins to operate, there will be very low pressure in the attenuator 22. As the pump 14 continues to operate (e.g. possibly for the first half minute or so of operation), the pressure in the attenuator 22 will build up toward the operating pressure (e.g. 55,000 PSI), and the back pressure from the attenuator will be felt back through the intensifier unit 12 and in turn create back pressure in the pump delivery line 68. At this time, the pressure relief valve 20 remains closed, with the pressure in the compensator valve control pistons 62 and 64 being substantially equal, and the compensator valve element 60 remaining in its down position. As soon as a modest amount of hydraulic pressure develops in the line 68, with the control piston 56 having a larger cross sectional area than the piston 54, the stroke ring 48 will move further to its right toward its maximum stroke position, so that the volumetric flow rate increases to approximately 50% of its target flow rate. However, as indicated above, as soon as the pressure in the line 68 becomes greater than the threshold pressure of the pressure relief valve 20, the valve element 60 and the compensator 18 will begin operating to move between their upper and lower positions to cause the stroke ring 48 to become positioned more at the intermediate location where the volumetric flow rate is closer to the target level.

Now let us examine what occurs when the piston assembly 32 reaches the end of its stroke. When this occurs, it triggers a mechanism to cause the control valve 16 to shift so as to reverse the fluid flow to the intensifier unit 12. Thus, as shown in FIG. 1, the high pressure flow had been to the right side of the central piston 34, and it will now be reversed to pressurize that portion of the central cylinders 28 that is to the left of the control piston 34. There will be a time lag of approximately 60 milliseconds for the piston assembly 32 to reverse direction. During this time, the pump 14 continues to run, and if appropriate provisions were not made, this would cause an undesirable abrupt pressure spike.

However, the valve 16 is arranged (as is known in the prior art) so that during switching of the valve 16, the fluid flow through the line 68 is bypassed to alleviate this pressure spike.

Let us now assume that the piston assembly 32 is now beginning its travel from the left hand position of FIG. 1 toward the right. At this time, the right high pressure cylinder 30 has just been filled with low pressure water. As the piston assembly begins its pressure stroke to the right, the water in the right high pressure cylinder 30 is an a relatively low pressure since it has not been compressed. It is only after the piston assembly 32 has gone through about 15% of its stroke that the water in the right end cylinder 30 becomes compressed to about 15% of its original volume to reach its operating pressure (e.g. 55,000 PSI). By the time the piston assembly 32 reaches the end of its stroke, high pressure flow from the intensifier assembly 12 to the attenuator 22 has been interrupted temporarily (e.g. for possibly 150 milliseconds). At this time, the attenuator 22 is able to maintain liquid flow through the nozzle orifice 24, but with a moderate drop in pressure (e.g. several thousand PSI).

Also, when the piston assembly 32 reaches the end of its stroke and starts moving in the opposite direction, the abrupt drop in back pressure is felt upstream so that there is also an abrupt drop in pressure in the pump outlet line 68 and also the lines connected thereto. As indicated above, it is the pump 14 itself which creates its own reference pressure by its connection with the line 70 and 80 leading to the pressure relief valve 20. The result is that when the pressure in the line 68 drops possibly 1,990 to 1200 PSI (e.g. to 1,750 to 1550 PSI, assuming its desired operating pressure in 2,750 PSI), the pressure in the two compensator control pistons 62 and 64 will drop accordingly and the compression spring 66 will urge the valve element 60 to its down position, which will in turn cause equal hydraulic pressure to be exerted in the two stroke ring control pistons 54 and 56 and thus cause the stroke ring 48 to move laterally to the right to its high fluid flow output position.

Figure 4A:
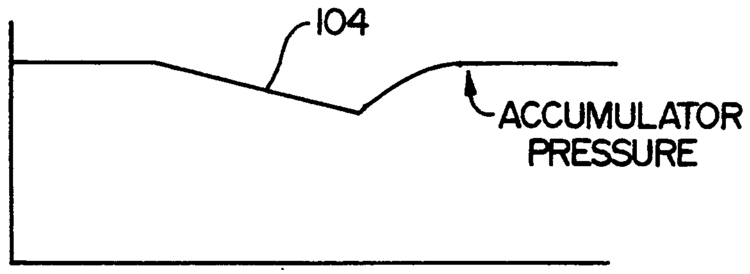
FIG. 4A PRIOR ART
FIGS. 4A–4C are graphs illustrating operating characteristics of the prior art intensifier system in FIG. 1.
Figure 4B:
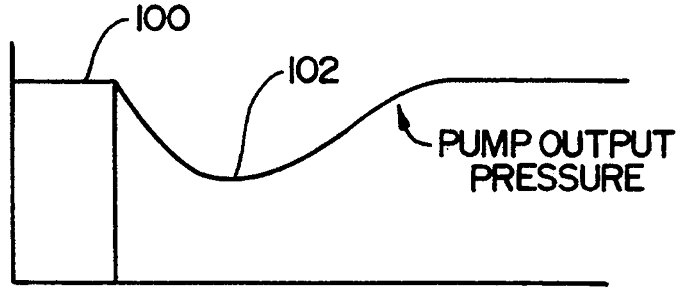
FIG. 4B PRIOR ART
Figure 4C:
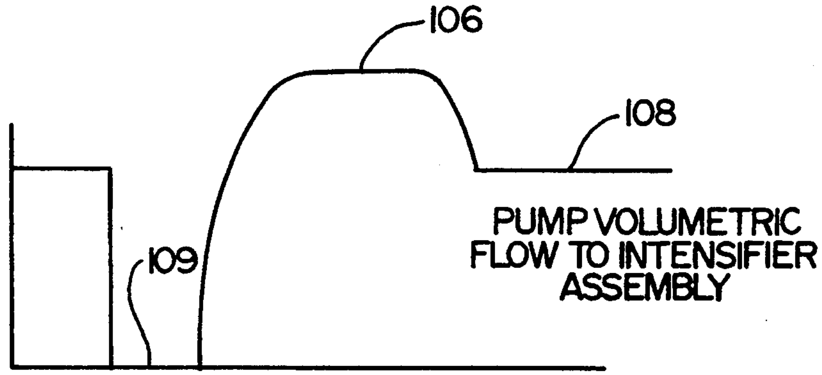
FIG. 4C PRIOR ART

This sequence will now be explained relative to FIGS. 4A, 4B and 4C to illustrate the flow and pressure characteristics. It is to be understood that the curves in FIGS. 4A, 4B and 4C are to some extent approximations of the exact valves. FIG. 4B shows the fluid pressure output from the pump 14 toward the end of its stroke. It can be seen that at the portion of the curve shown at 100, the pump 14 is operating at full pressure, and the piston assembly 32 is near the end of one of its stroke. At the portion of the pressure curve shown at 102, the piston assembly 32 has reached the end of its stroke and is starting to move in the reverse direction and is starting into the compression portion of the stroke where it is simply compressing the water in the high pressure cylinder 30 in which the related high pressure piston 36 is acting.

It can be seen at 104 in FIG. 4A that the pressure in the accumulator drops moderately during this interruption of the water flow from the intensifier assembly 12. It can also be seen in FIG. 4C than the compensator 18 has reacted to move the stroke ring 48 laterally to its high output position no temporarily cause the fluid flow rate to increase to a higher level as shown in 106. However, after the water in cylinder 30 has been pressurized up to the level of the pressure in the accumulator 22, then the system stabilizes and the volumetric flow rate from the pump drops down to its target level of 108.

It will be noted that at the curve portion 109 in FIG. 4C, the pump volumetric flow rate is indicated as being zero. During this time, the pump is actually pumping fluid, but this is being bypassed through the control valve 16 to the sump 44. After the valve element in the control valve 16 has completed its movement to the second position, then the flow to the intensifier climbs abruptly.

As indicated previously, it is to be understood that the high pressure intensifier system described above and the entire operation thereof, as described above, already exist in the prior art. However, it is important to understand the operational characteristics of the prior art system 10 to arrive at a proper understanding of the functions and advantages of the present invention.

b. Arrangement and Operation of a Typical Prior Art Dual Two Intensifier System Operating in Parallel For some applications, it is desirable to operate a pair of high pressure intensifiers in parallel. For example, it may be that the high pressure output of a single commercially available intensifier would not be adequate, and it is necessary to employ two such intensifiers to get adequate volumetric flow rate of very high pressure water.

However, one of the serious problems in operating two intensifiers in parallel is that the timing of the operating cycles of the two intensifiers are in general not equal. As a practical matter it is generally necessary to control the two intensifiers from the same pressure reference source, which would be a simple pressure relief valve 20. Even though the two intensifier systems are intended to be identical systems, there will be minor differences. For example, after a certain amount of use, there will be wear, there might be a certain amount of leakage in one or more of the seals, valves, etc. This will often result in one intensifier unit operating faster than the other.

When this happens, the piston assembly 32 of one of the intensifiers 12 will from time to time "catch up" to the piston assembly 22 of the other intensifier assembly 12 so that for a short period of time they are reciprocating in phase. In this situation, the pressure dips in the overall system can be rather severe. For example, in conducting some experiments on dual intensifier systems, a number of observations were taken on an intensifier designed to produce output water pressures of 55,000 PSI. In a single intensifier system (i.e. one pump 14 and one intensifier unit 12), with an oil pressure of 2750 PSI from the pump, when the intensifier assembly 12 would shift at the end of the stroke, the water pressure would dip about 2500 PSI (a little bit less than a 5% drop, and the hydraulic pressure would dip by about 1,000 PSI. However, when two such intensifier units, each with its own pump were operated in parallel, when it occurred that they were operating "in phase" so that the strokes would be completed at the same time, the pressure dips would be more severe. In fact, in some instances, when the two intensifier assemblies 12 arrived at an "in phase" mode, they would sometimes "lock up" and stay locked up so that every shift would be a double shift. This is, of course, the worst case.

In arriving at the solution of the present invention, substantial analysis was done on this problem of the "in phase" shifting of intensifier assemblies operating in parallel. It is believed that a better understanding and appreciation of the present invention will be achieved by reviewing at least briefly some of the results of this analysis.

Figure 5:
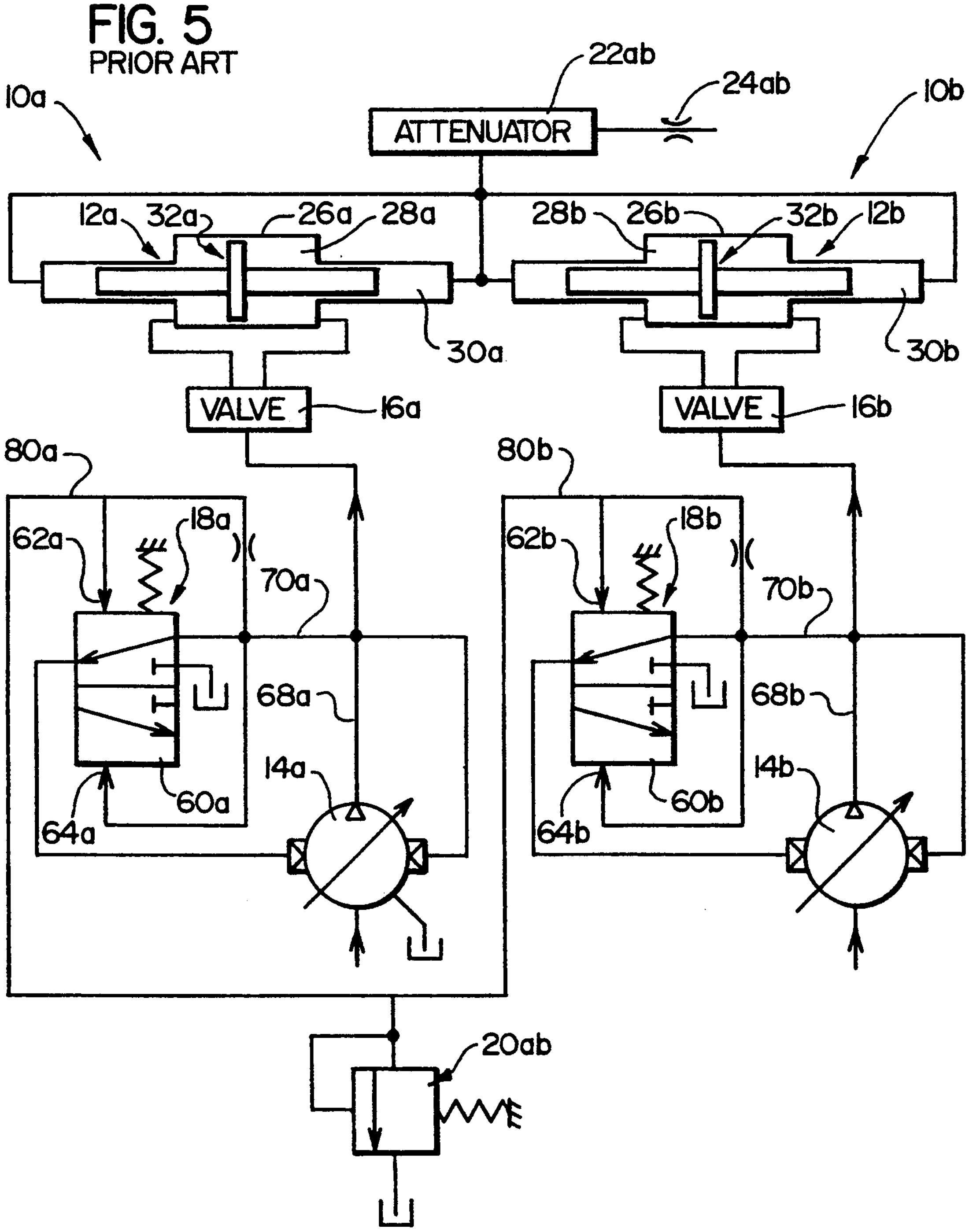
FIG. 5 PRIOR ART
FIG. 5 is a schematic view, similar to FIG. 1, showing a prior art dual high pressure intensifier system.

Reference is now made to FIG. 5, which shows portions of two intensifier systems operating in parallel. The two systems will have numerical designations corresponding to those used in describing in Section "a" of this text the prior at system 10, with an "a" suffix distinguishing those of the first intensifier system, and a "b" suffix distinguishing those of the second intensifier system that is operating in parallel with the first intensifier system. There are two pumps 14*a* and 14*b*, two compensators 18*a* and 18*b* are shown, and only a single pressure relief valve 20*ab* that serves both of the first and second intensifier systems 10*a* and 10*b*.

Further, there are two intensifier units 12*a* and 12*b*, feeding very high pressure water to a single attenuator 22*ab* which directs the high pressure fluid through a nozzle 24*ab*.

Let us now review a typical situation in this prior art arrangement of the FIGS. 5, where one intensifier unit 12*a* operates slightly faster than the other intensifier unit 12*b*. With reference to FIG. 5, let it be assumed that the piston assembly 32*b* moves faster than the piston assembly 32*a*, and that as shown in FIG. 5) the piston assembly 32*a* is slightly ahead of the piston assembly 32*b*. Since the output lines 68*a* and 68*b* are connected through their respective compensators 18*a* and 18*b* to a common pressure relief valve 20*ab*, the pressures delivered by the pumps 14*a* and 14*b* is substantially identical, and thus the hydraulic pressures in the main cylinders 28*a* and 28*b* are substantially the same.

The piston assembly 32*a* hits the end of its stroke slightly before the piston assembly 32*b* hits the end of its stroke. It takes about 60 milliseconds for the piston assembly 32*a* to start reversing direction. Then it takes about another 100 milliseconds or so for the piston assembly 32*a* to precompress the water in the cylinder 30*a* to the operating pressure. (As indicated earlier, precompression of the water before flow begins from the high pressure cylinder 30*a* requires about 15% of the total stroke.)

As soon as the piston assembly 32*a* reaches the end of its stroke, there is a pressure drop created in the line 68*a*, and this pressure drop is felt back through the line 70*a*–80*a* and back through the line 80*b*. Thus, the valve element 60*b* experiences this pressure drop at its upper compensator valve control cylinder 62*a*.

At this time, the second piston assembly 32*b* is in the last part of its stroke, and its related pump 14*b* is delivering hydraulic fluid to its intensifier unit at (or very close to) the target pressure. When the pressure in the line 80*b* drops (due to the piston assembly 32*a* reaching the end of the stroke), this tends to move the compensator valve element 60*b* upwardly so as to reduce the volumetric flow from the pump 14*b*.

At the time the second piston assembly 32*b* reaches the end of its stroke, the other piston assembly 32*a* is starting the initial phase of its return stroke, and is thus starting to compress the water in the high pressure cylinder 30*a* which is then being pressurized. As the pressure increases in the cylinder 30*a*, this will in turn increase the back pressure and thus raise the pressure in the line 68*a* and in the lines connected therewith. However, at about this same time, with the second piston assembly 32*b* reaching the end of its stroke, there will be a sharp decrease in the pressure in the pump output line 68*b*, and this will be reacted back through the system to the line 80*a* and reduce the pressure at the upper end of the valve element 60*a* of the first compensator 18*a*.

The effect of this is that the valve element 60*a* will tend to move upwardly so as to cause the pump 14*a* to go more off-stroke (i.e. decrease its volumetric flow rate), and thus cause the piston assembly 32*a* to move more slowly into its compression stroke.

The net effect is that the faster moving piston assembly 32*b* will continue to "catch up" with the piston assembly 32*a* and will then be substantially "in phase" with the piston assembly 32*a*, so that the two piston assemblies 32*a* and 32*b* will reach the end of the stroke at nearly the same time, thus intensifying the effect of the pressure drop. Further, analysis has shown that the interaction of these pressure drops in the control lines 80*a* and 80*b* in all likelihood have the effect of impeding the ability of the pumps 14*a* and 14*b* and their associated intensifier units 12*a* and 12*b* from reacting rapidly enough to alleviate the undesired pressure drop. However, it is to be understood that this is a dynamic process, and the precise effects and these pressure fluctuations will vary, depending upon certain factors. In any event, it has been found that these problems do exist with such prior art dual intensifier systems. These problems can be alleviated to some extent by utilizing an attenuator 22*ab* that has a large capacity accumulator to balance out these pressure drops more effectively,. However, this adds bulk and expense to the system.

c. The First Embodiment of the Present Invention

In describing this first embodiment, components of this second embodiments which are substantially the same as, (or at least closely similar to) components of the prior art intensifier system 10 described earlier herein in Section a will be given like numerical designations, with a "c" suffix distinguishing a first intensifier system of this first embodiment, and a "d" suffix distinguishing those of the second intensifier system of the second embodiment.

The apparatus of this first embodiment is substantially the same as that shown in the prior art dual intensifier shows in FIG. 5 and described in Section b above, except that certain components are added. Thus, there are the two intensifier units 12*c* and 12*d*, each having a respective pump 14*c* and 14*d*, control valve 16*c* or 16*d*, and compensator 18*c* or 18*d*. There is s single pressure relief valve, 20*cd*, a single attenuator 22*cd*, and a single nozzle outlet means 24*cd* (which could actually be a single orifice or a plurality of orifices connected to the output of the alternator 22*cd*). All of these components listed in this above paragraphs are substantially identical to the corresponding components described in Sections a and b of this description. Accordingly, these will not be described further in any detail in this section.

The components which are added to this system to make up the second embodiment are first and second check valves 110*c* and 110*d* installed in the control lines 80*c* and 80*d*, respectively, at a location between the compensator 18*c* and check valve 20*cd*, and between the compensator 18*d* and the pressure relief valve 20*cd*, respectively. In addition, there is between the check valve 110*c* and attenuator 18*c* a first adjustable needle valve 112*c*, and there is a second adjustable needle valve 112*d* positioned between the check valve 110*d* and the compensator 18*d*.

The check valve 110*c* is arranged so that it permits fluid flow from the location of the compensator 18*c* through the line 80*c* and through the check valve 110*c* to the pressure relief valve 20*cd*. The other check valve 110*d* is similarly positioned so as to permit flow from the compensator 18d through the line 80d to the pressure relief valve 20cd.

It has been found that the arrangement of this first embodiment solves the problem of the faster acting intensifier unit 12d from overtaking the slower intensifier unit 12c, so that the cycles of the two intensifier units 12c and 12d are such that the units 12c and 12d do not reach the end of their stroke at the same time. Further, as will become apparent from the following more detailed description, in addition to preventing this problem of the intensifier units 12c and 12d hitting the end of the stroke at the same time, this arrangement of the first embodiment also helps to substantially minimize the pressure drop present in the prior art arrangement of FIG. 5. More specifically, in an arrangement of this first embodiment where there were two intensifier units having an output at a water pressure 55,000 PSI, the pressure drop was reduced to as low as 1,000 PSI when one or the other of the intensifier units would reach the end of its stroke.

Figure 6:
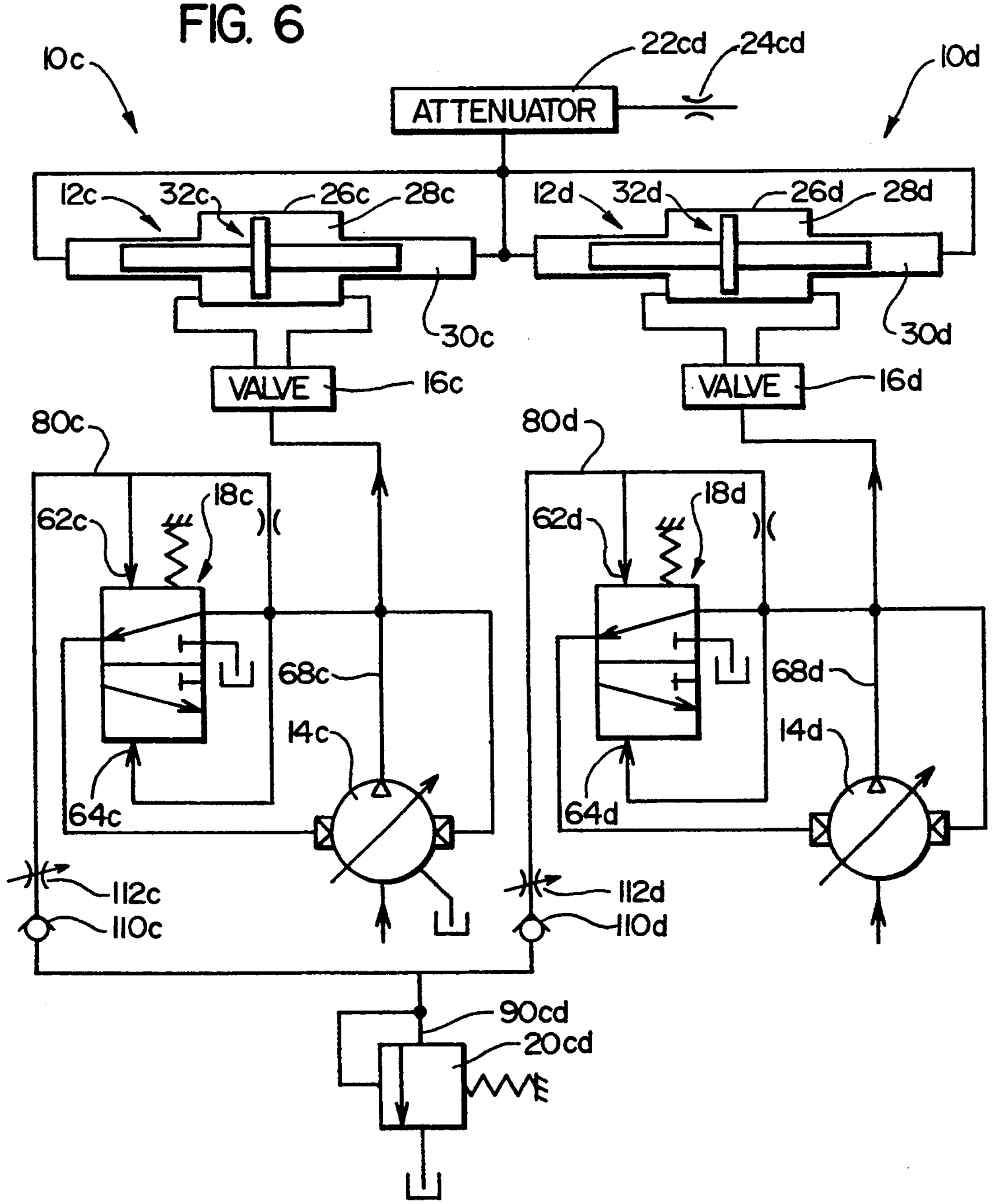
FIG. 6 is a view of the first embodiment of the present invention similar to FIG. 5, but showing the improvement of the present invention applied to the system such as shown in FIG. 5.
Figure 7A:
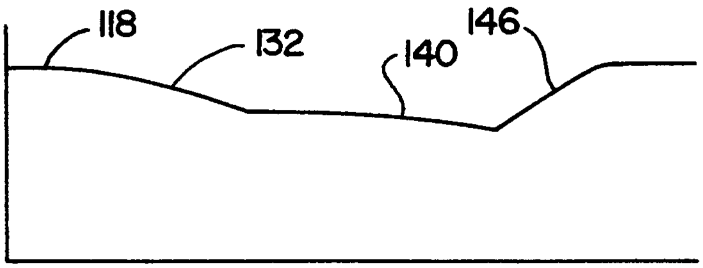
FIGS. 7A–7E are graphs illustrating the operating characteristics of the first embodiment of the present invention shown in FIG. 6.
Figure 7B:
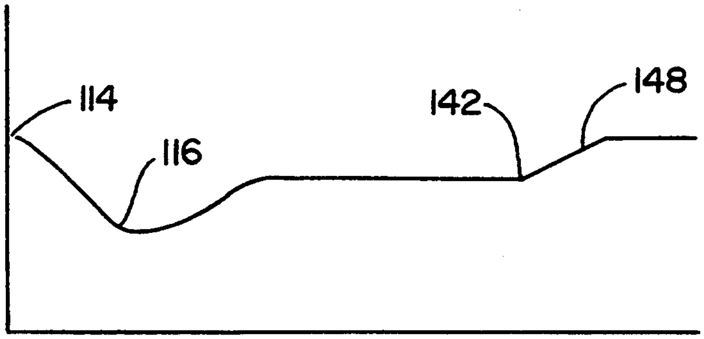
Figure 7C:
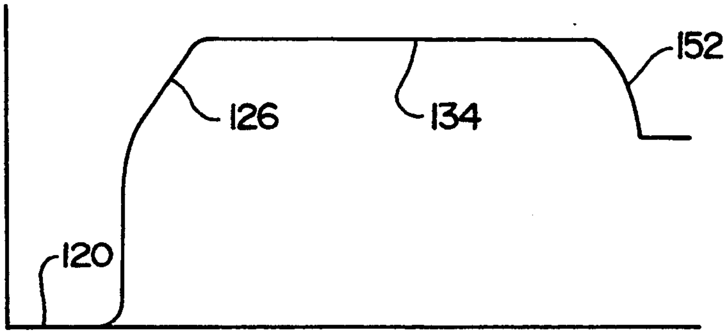

The manner in which this first embodiment operates will now be described with reference FIG. 6 and to FIGS. 7A through 7E. Let us assume that the piston assembly 32c of the first intensifier unit 12c is moving toward the end of its stroke and is slightly ahead of the piston assembly 32d of the second intensifier unit 12d. When the piston assembly 32c reaches the end of its stroke, the control valve 16c starts to switch, thus cutting off flow to the central chamber 28c. FIG. 7B illustrates the line pressure in the pump output line 68c, and the location 114 in FIG. 7B illustrates the line pressure at the time the valve 16c is just starting to switch over. The location 116 in FIG. 7B indicates the pressure at the time the control valve 16c has completed its switching and hydraulic flow is now traveling into the chamber 28c to start the next stroke of the piston assembly 32c in the opposite direction.

During the switching of the control valve 18c, the flow of water from the intensifier unit 12c is interrupted, so that the attenuator 22cd is receiving only half of its total flow. This causes a pressure drop in the attenuator, and this drop is illustrated an 118 of FIG. 7A. Also, during the switch over of the control valve 16c, the flow from the pump 14c is diverted by the valve 16c, so the net flow to the intensifier unit 12c is at that time substantially zero, and this is illustrated at 120 of FIG. 7C.

Figure 7D:
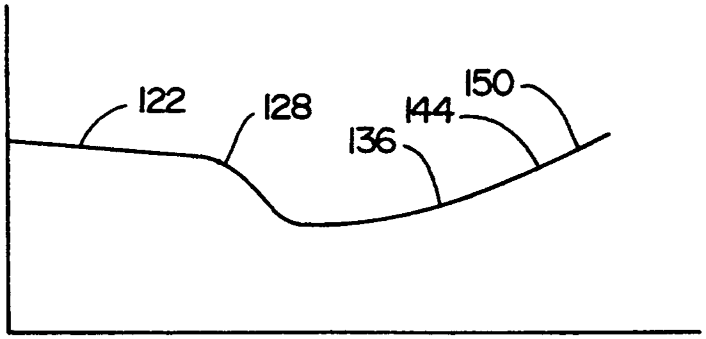
Figure 7E:
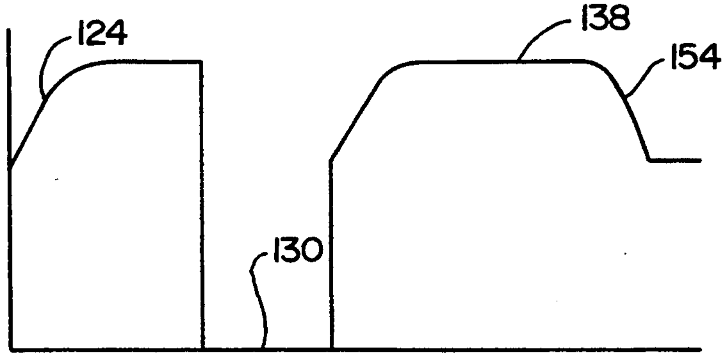

FIG. 7D illustrates at 122 what is happening to the pressure in the line 68d of the pump 14d. When the valve 16c is switching to stop flow from the intensifier unit 12c to cause the attenuator pressure drop at 118, the intensifier unit 12d which is approaching the end of its stroke feels this reduction in back pressure from the attenuator 118. This is a signal for the pump 14d to go more on stroke (i.e. increase its volumetric flow). The increase in volumetric flow from the pump 14d is illustrated at 124 in FIG. 7E.

At this point, attention should be called to the function served by the check valve 110c in enabling the pump 14d to increase its volumetric output. Prior to the time that the piston assembly 32c of the intensifier unit 12c reached the end of its stroke, the pressure in the lines 80c and 80d and the line 90cd leading into the check valve 20cd were at (or very close to) the target operating pressure, which in the particular example of this first embodiment would be 2,750 PSI. However, it will be noted that as soon as the piston assembly 32c reached the end of its stroke, as illustrated in FIG. *7d*, the pressure in the line 80c between the check valve 110c and the compensator 18c begins to drop.

In the prior art dual intensifier system described in Section b above, this drop in pressure at the output line 68a would have been felt throughout the system and thus also reduce the pressure in line 80b. However, this does not happen in this embodiment, and the reason for this is that the check valve 110c prevents any flow from the line 80d through the check valve 110c into the line 80c. Thus, the reference pressure at the top control piston 62d of the compensator 18d is at full line pressure. Accordingly, when the pressure in the output line 68d from the pump 14d begins to drop, the compensator valve element 60d will stay at its down position to cause the pump 14d to go more on stroke and increase its volumetric outflow toward as much as 50%. As indicated previously in the description under Section b, this does not occur in the dual prior intensifier system described in Section b above.

The question may now arise that if the initial effect of this is to increase the flow from the pump 14d would this not in turn cause the piston assembly 32d of the intensifier unit 12d to travel yet faster and increase the tendency for the faster acting intensifier unit 12d to catch up. It is true that at this particular portion of the cycle, the piston assembly 32d does begin to move faster. However, as will be described below, this is not the only effect, and overall (as will be described later) the slower moving piston assembly 32c will receive a boost so that it actually pulls away from the piston assembly 32d.

At the completion of the switching of the control valve 16c, hydraulic fluid is directed into the portion of the chamber 28c which is now being pressurized to move the piston assembly 32c in the opposite direction to start the subsequent stroke. As indicated previously, the initial portion of the stroke is the precompression portion where pressure builds up in the end cylinder 30c into which the related piston 34c is moving.

As the pressure in the line 68c from the pump 14c continues to build up as its related piston assembly 32c pressurizes the water in the end chamber 30c that is then being pressurized, the pressure at the upper control piston 62c of the compensator 18c will be sufficient keep the compensator valve element 60c in its down position so that the pump 14c will go more on stroke and increase its volumetric flow to the maximum. This is illustrated by the curve portion 126 of FIG. 7C.

In about this same time frame, the second piston assembly 32d reaches the end of its stroke, and its related control valve 16d begins to switch. At this point, the back pressure on the piston assembly 32d will drop, and this will cause the line pressure in the line 68d from the pump to decline, as illustrated at 128 of FIG. 7D. At the same time, during the switching of the control valve 16c flow from the pump 14d to the unit 12d diminishes to substantially zero, and this is illustrated at 130 FIG. 7E.

At this time, the effect of the check valve 110d is realized. This check valve 110d substantially isolates the line 80c from the line 80d. Thus, as the pump 14c continues to be operated at full volumetric flow so as to build up pressure in the line 68c, the reference pressure in the line 80c remains unaffected by the drop of pressure in the line 80d, this being accomplished by the check valve 110d that prevents flow from the line 80c passing through the check valve 110d to the line 80d.

During this same time period, the first intensifier unit 12c is not yet delivering water to the attenuator 22cd.

Also, the control valve 16d is switching so that the flow of water from the second intensifier unit 12d is interrupted. This causes a further and more sharp decline in the attenuator pressure, and this is illustrated at 132 in FIG. 7A. (For purposes of illustration, the pressure drop shown in FIG. 7A is exaggerated. in actual practice, the total pressure drop in the attenuator 22cd would be rather small, in the order of 2–3%).

When the piston assembly 32c completes the compression of the water in the end cylinder 30c so that the pressure in the end cylinder matches the attenuator pressure, then fluid will start to flow from the intensifier unit 12c to the attenuator 22cd. At this time the pressure in the attenuator 22cd is somewhat lower than the target pressure (which in this particular example is at 55,000 psi), and this lessening of the pressure results in the hydraulic pressure in the line 68c being moderately below its target pressure of 2,750 psi. The result of this is that the pump 14c is caused to go more on stroke to match the target pressure, with the valve element 60c remaining in its down position. The flow from the pump 14c continues above its normal flow rate, and this is illustrated at 134 in FIG. 7C.

At this time the pump 14d is supplying hydraulic fluid into a portion of the chamber 28d to start the piston assembly 32d on its stroke in the opposite direction, and the initial portion of this stroke is the compression portion where pressure is building up in the intensifier unit 12d and there is also a rise in pressure in the pump output line 68d. This rise is illustrated at 136 in FIG. 7D. At the same time, the pump 14d is establishing its own reference pressure which it is trying to match, and accordingly the valve element 60d remains in its down position so that the pump 14d goes more on stroke, so that the volumetric flow from the pump 14d rises to 50% above its target level, this being illustrated at 138 in FIG. 7E. However, since the piston assembly 32d is still in the initial compression portion of its stroke, the intensifier unit 12d is not yet delivering water to the attenuator 22cd. Even though the first intensifier unit 12c is delivering water at a volumetric flow rate 50% greater than its target flow rate, the attenuator pressure continues to decline slightly. This is illustrated at the portion of the curve indicated at 140 in FIG. 7A. At this same time, the line pressure from the pump 14d is increasing, and the pump 14d is operating at its maximum flow rate (which is about 50% greater than the target volumetric flow rate).

Then at the location indicated at 142 of FIG. 7B and at 144 in FIG. 7D, the pressure developed by both of the intensifier units 12c and 12d have reached a level where the pressure matches the pressure level at the attenuator 22cd. At this time, the pressure in the attenuator 22cd rises sharply as indicated at 146 in FIG. 7A. Also, the line pressure builds up in both pumps 14c and 14d, and this is illustrated at 148 and 150 in FIGS. 7B and 7D, respectively.

When the pumps 14c and 14d are delivering hydraulic pressure at the target level (in this example at 2750 psi), then the two compensators 18c and 18d come into play and cause the stroke rings of the pumps 14c and 14d to move more toward the center position so that the flow rates are reduced toward the target level. This reduction in the volumetric flow rate from the pumps 14c and 14d are illustrated at 152 and 154 of FIGS. 7C and 7E, respectively. At this time, both piston assemblies 32c and 32d are delivering water to the attenuator at the desired pressure level, and the pressure in the attenuator 22cd remains substantially constant. Also, the line pressure in each pump 14c and 14d remains substantially constant.

The two needle valves 112c and 112d are utilized to "fine tune" the system. It is to be recognized that the velocity compensation accomplished by the present invention works up to a point. However, differences in leakage past the four way valve spools of the control Valves 16a and 16b, and also differences in the seals and check valves of each intensifier units 12c and 12d run at different speeds. Normally, when the intensifier units 12a and 12b are new, they run at speeds which are close to each other and the double shift is less of a problem. However, when a seal starts to leak, the intensifier unit tends to run at a higher speed, thus resulting in more frequent cross-overs and larger pressure dips described above.

One way to overcome this problem is to speed up the slower intensifier unit 12c or 12d. This can be accomplished by adjusting the needle valve 112c or 112d. These needle valves 112c and 112d are normally fully open. But, by closing one valve 112c or 112d slightly, this can produce a pressure drop across that needle valve and thereby raise the pressure in the compensator line 80c or 80d for the slower moving intensifier unit 12c or 12d.

This system of the first embodiment provides a number of benefits. First, when the faster piston assembly 32d is close behind the slower piston assembly 32c, the slower intensifier unit 12c is given a boost in its velocity at the start of its stroke so that the piston assembly 32c moves further ahead of the piston assembly 32d of the other intensifier unit 12d. Then as the piston assemblies 32c and 32d continue on their second stroke toward the opposite end of the intensifier, the faster piston assembly 32d is catching up. However, the first piston assembly 32c reaches the end of its stroke a little before the second piston assembly 32d reaches the end of its stroke, and then the slower moving piston assembly 32c again gets the extra boost to move it further ahead of the second, faster moving piston assembly 32d. This pattern keeps repeating itself so that the second piston assembly 32d never does catch up, and the two piston assemblies 32c and 32d never are totally in phase.

A second benefit of the present invention is that the volumetric flow rates of the two pumps 14c and 14d are raised to their higher levels at the end of the piston strokes and at the beginning of next strokes to alleviate, to a significant extent, the drop in the attenuator pressure during reversing of the piston assemblies 32c and 32d. To review this briefly, when the first piston assembly 32c reaches the end of its stroke and thus stops delivering water to the attenuator 22, the second pump 14d is caused to moved towards it maximum volumetric flow rate as illustrated 124 in FIG. 7E. Then, as soon as the first piston assembly 32c begins its return stroke, the pump 14c responds by going to its full volumetric flow rate as indicated at 126 and 134. When the second piston assembly 32d starts its return stroke, then the second pump 14d starts operating at its maximum volumetric flow rate, as indicated at 138.

The overall effect of this is that both pumps 14c and 14d are operating more effectively in comparison with the operation of the pumps 14a and 14b of the prior art dual intensifier system described in Section b above.

Further, as indicated above, since the boost in volumetric flow rate to the first pump 14c lasts not only through the compression phase of the piston assembly 32c, but also through the switching of the control valve 16d of the other intensifier unit 12d and also through the entire compression portion of the stroke of the intensifier unit 12d and beyond that until the pressure from the intensifier units 12c and 12d brings the attenuator pressure up to its proper level, the overall length of the boost given to the slower moving piston assembly 12c is sufficiently great to remedy the problem of the two intensifier units operating totally in phase and thus creating the substantial pressure dip. It should be kept in mind that the curves shown in FIGS. 7A–7E are to some extent approximations, and values such as switching times, the period during which flow from the pumps 14c and 14d are increasing and other values could vary.

At this time, the overall operation of this first embodiment will be briefly summarized.

1. At the time the piston assembly 32c reaches its end limit of travel in a stroke, the flow from the intensifier unit 12c, which is a short distance of the unit 12d in its stroke, is interrupted so that the inflow into the attenuator 22cd is suddenly cut in half, while the outflow does not change. Accordingly, the pressure in the attenuator 22cd begins to drop.

2. The intensifier unit 12d experiences reduced back pressure, and this is a signal for the pump 14d to go more on stroke and deliver a higher flow rate. However, this takes some time to respond. During this time, the intensifier unit 12c substantially completes its reversing and has gone into the pre-compression portion of its next stroke, so that it is ready to deliver flow to the attenuator 22cd.

3. By this time, the piston assembly 32d has hit its end limit of travel. Even if the pump 14d is now fully on stroke, this is not enough in its attempt to overtake the piston assembly 32c.

4. At this point in time, the intensifier unit 12d is reversing and cannot supply the attenuator 22cd with fluid, while the pump 14c has just come fully on stroke during pre-compression. The pump 14c continues to be fully on stroke as it tries to bring the pressure in the intensifier unit 14c up to its operating pressure. This results in nearly fifty percent higher flow rate from the unit 12c for the pump 14c and fifty percent higher velocity for the piston assembly 32c. Thus the piston assembly 32c gets a boost in speed.

5. However, this state of affairs only last until the intensifier unit 12d has finished reversing. By this time the intensifier unit 12c has partially restored and held up the pressure in the attenuator 22cd. It has also gained distance and pulled away from the piston assembly 32d.

6. When the unit 12d is on the initial portion of the stroke, the pressure in the attenuator 22cd is brought up to the normal pressure very soon. Then both pumps 14c and 14d back off to their normal setting. During the rest of the stroke, the second intensifier unit 12d starts to gain on the first intensifier unit 12c since it is slightly faster, but the difference in speed is not enough to overtake the unit 12c within that cycle.

7. The cycle repeats itself again when the two intensifier units 12c and 12d end their subsequent strokes.

d. Second Embodiment of the Present Invention

In describing this second embodiment, components that are the same as or similar to the prior art systems described earlier herein and/or the first embodiment will be given like numerical designations, with the suffixes "e" and "f" being used to designate those components of the first and second systems which comprise this dual intensifier system of the second embodiment.

Figure 8:
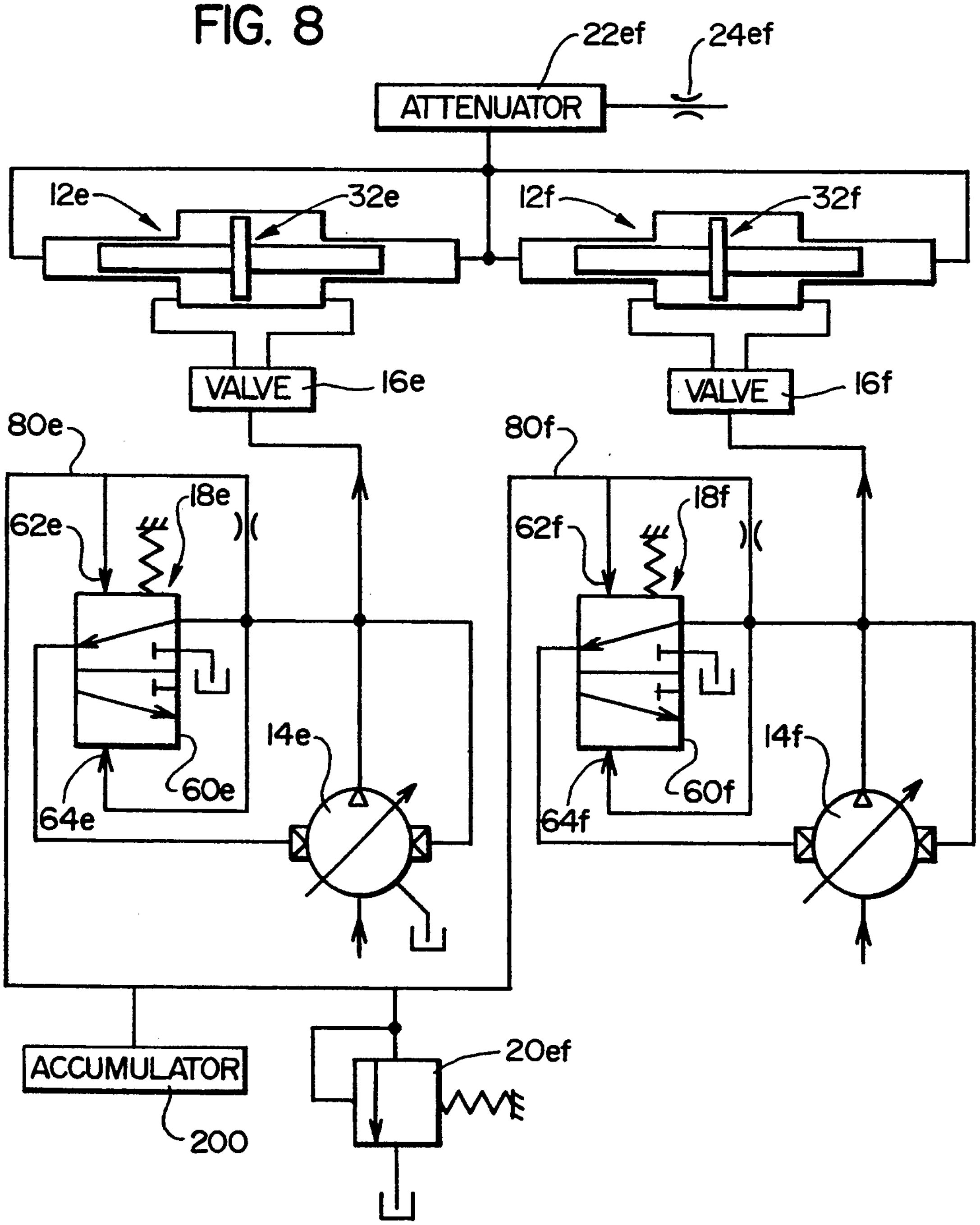
FIG. 8 is a view similar to FIGS. 5 and 6, but showing a second embodiment of the present invention.

This second embodiment is shown in FIG. 8, and it contains substantially the same components as the prior art dual system shown in FIG. 5 and described in Section b of this patent application. However, there is added an accumulator in the control line leading to the pressure relief valve 20ef.

Thus, it can be seen that there are two intensifier units 12e and 12f, two pumps 14e and 14f, two control valves 16e and 16f, two compensators 18e and 18f, a single pressure relief valve 20ef, a single attenuator 22ef, and single nozzle means 24ef. These components recited in this paragraph are, or may be, substantially the same as those described with reference to the prior art dual system in Section b of this description, so these will not be described herein.

The accumulator that is added to this second embodiment is designated 200, and it is, or may be, a prior art accumulator which functions in a conventional fashion to respond to pressure changes in the fluid line to which it is connected to alleviate pressure variations to keep the pressure close to a target level. As is well known in the prior art such accumulators can comprise a bladder or the like that is pressurized on one side by a compressed gas, with the other side being exposed to the fluid which would experience the pressure variations. In a test conducted with a dual intensifier system as described earlier herein with this accumulator 200 being added, it was found that an accumulator with a one gallon capacity was capable of producing a significant improvement in alleviating the problems discussed above with reference to the prior art dual intensifier systems.

To describe the operation of the second embodiment, during those periods when one or the other of the piston assemblies 32e and 32f reaches the end of a stroke, so that there is a drop in pump pressure of either or both of the pumps 14e and 14f, the accumulator 200 will act to restore fluid into the control lines 80e and 80f to maintain the reference pressure closer to the target level. Therefore, this will enable the pumps 14e and 14f to operate at a maximum volumetric flow rate at such times. The manner in which this accomplishes the ends of the present invention is believed to be apparent from the previous detailed description relative to the first embodiment, so this will not be discussed further at this time.

e. Third Embodiment of the Present Invention

Figure 9:
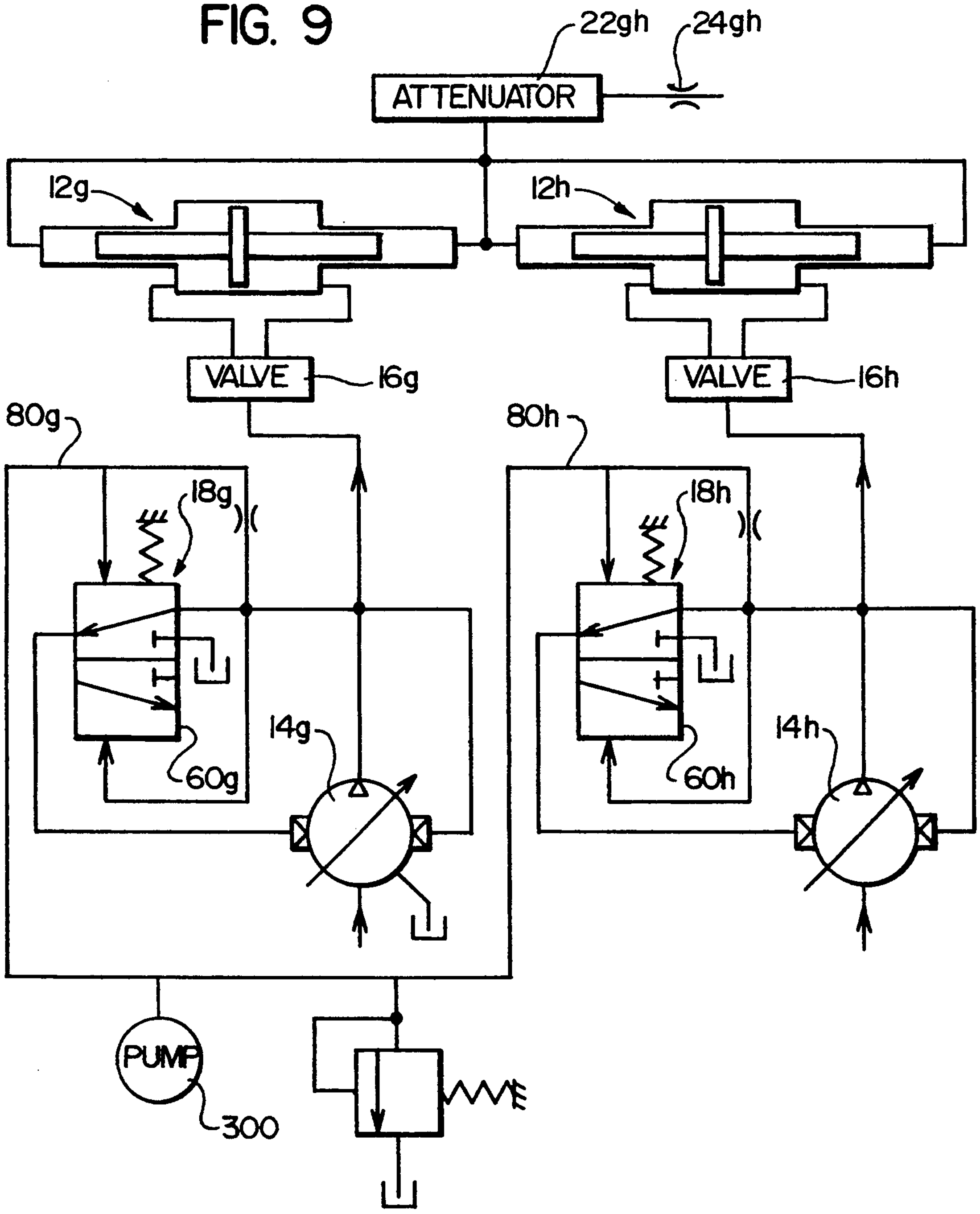
FIG. 9 is a schematic view similar to FIG. 8, showing yet a third embodiment of the present invention.

A third embodiment of the present invention is illustrated in FIG. 9. Components of this third embodiments which are similar (or the same as) components of the first two embodiments and/or similar to the prior art systems described herein will be given like numerical designations, with "g" and "h" suffixes distinguishing the components of this third embodiment.

This third embodiment is substantially the same as the prior art dual intensifier system described in Section b of this patent application. However, there is added a reference pump 300 that supplies pressurized fluid into the control lines 80g and 80h. Thus, in the dual system as shown in FIG. 9, when one or the other of the pumps 14g or 14h experience a pressure drop during the switching of the respective control valves 16g and 16h and the compression portions of the piston stroke, the control pump 300 is able to supply adequate fluid at or close to the reference pressure level to maintain adequate reference pressure at the top end of the compensator valve elements 60g and 60h.

It is believed that the manner in which this influences the operation of this dual system of the third embodiment is evident from the description of the first embodiment, so this will not be described in detail herein.

Figure 10:
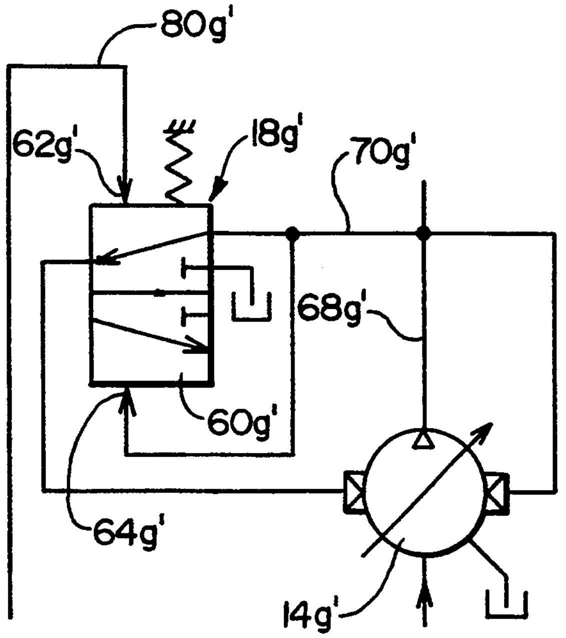
FIG. 10 is a schematic view of a modified form of the compensator means and pump of the third embodiment shown in FIG. 9.

FIG. 10 shows a possible modification of this third embodiment. For ease of illustration, only one compensator 18*g* and pump 14*g*′ is shown, and a prime (′) designation is added to distinguish the components of this modified form of the third embodiment.

It can be seen that the compensator 18*g*′ is substantially the same as the compensator shown in FIG. 9, except that the orifice 78 and the line in which it is positioned is eliminated, and is also eliminated in the other pump 14*h* and compensator 18*h*. Therefore, the line 70′ leading from the output of the pump 14*g*′ leads only to the bottom control piston 64*g*′ and also provides a flow passage to the valve element 60*g*′. Only the line 80*g*′ leads to the upper compensator control piston 62*g*′.

To describe the operation of this modified version of this third embodiment, the reference pump 300 (not shown in FIG. 10, but shown in FIG. 9) supplies pressurized fluid to the line 80*g*′ (and also to the corresponding control line 80*h*′ of the other part of the dual system) so that there is a constant reference pressure at the control piston 62*g*′ (and also to the other upper control piston for the other compensator 18*h*). Since the valve element 60*g*′ (and also the other valve element 60*h* not shown in this modification as illustrated in FIG. 10) will be isolated from the fluctuations of the two pumps 14*g* and 14*h* with regard to the reference pressure.

It is believed that the manner in which this alleviates the problems discussed previously herein with regard to the prior art embodiment described in Section b of this patent application is evident from the discussion of the operation of the first embodiment of the present invention. Accordingly, this explanation will not be presented in detail with reference to this modification of the third embodiment.

It is to be recognized that various modifications could be made in the present invention without departing from the basic teachings thereof.

What is claimed is:

1. In a multiple high pressure fluid intensifier system which comprises:

a. first and second intensifier units, each comprising a piston assembly that in turn comprises a main piston and two high-pressure pistons, each piston assembly being mounted for reciprocating motion to cause the two high-pressure pistons to alternately deliver high pressure output fluid through output means of the intensifier unit;

b. first and second pump means operatively connected to said first and second intensifier units, respectively, to deliver pumping fluid to said first and second intensifier units, respectively;

c. first and second control valve means to control the flow of pumping fluid to the first and second intensifier units, respectively, to cause said piston assemblies of the first and second intensifier units to reciprocate;

d. first and second compensator means operatively connected to said first and second pump means, respectively, each of said compensator means being responsive to a reference pressure and also responsive to pressure of its related pump means, to cause its related pump means to increase or decrease volumetric flow from its pump means in response to a difference between said reference pressure and said pump pressure;

e. attenuator output means adapted to receive pressurized fluid from said first and second intensifier units in a manner to provide a fluid back pressure to said intensifier units;

f. pressure reference means to provide said reference pressure for said first and second attenuator means;

g. said intensifier system being characterized in that the piston assemblies of said first and second intensifier units experience a back pressure from said attenuator output means that is reacted back to said first and second pumps, and the piston assemblies experience a drop in pressure in transitioning from an end of one stroke and into a start of another stroke;

the improvement comprising means operatively connected to said pressure reference means and to said first and second compensator means to maintain pressure reference inputs to said first and second compensator means at an adequately high level relative to operating pressures of said first and second pump means in a manner that said first and second compensator means responds to pressure differentials between said reference pressure inputs and pump pressures of said first and second pump means, to cause the first and second pump means to operate at higher volumetric flow rates during periods of the piston assemblies of the first and second intensifier units reaching an end of stroke position and entering into a subsequent stroke.

2. The improvement as recited in claim 1, wherein said improvement comprises first and second check valve means operatively positioned between said pressure reference means and said first compensator means and between said pressure reference means and said second compensator means, respectively, in a manner to permit flow from the first and second compensator means, respectively, toward said pressure reference means, and to prevent flow in an opposite direction, so as to isolate each of said compensator means from pressure drops of the pump means operatively connected to the other compensator means.

3. The improvement as recited in claim 2, wherein there are first and second valve means operatively positioned between said first copensator means and said pressure reference means and between said second compensator means and said pressure reference means, respectively, to control flow from said first and second compensator means, respectively, toward said pressure reference means.

4. The improvement as recited in claim 1, wherein said improvement comprises accumulator means connected to hydraulic line means interconnecting said first compensator means and said pressure reference means and also interconnecting said second compensator means with said pressure reference means, to reduce pressure fluctuations between said first compensator means and said pressure reference means and between said second compensator means and said pressure reference means.

5. The improvement as recited claim 1, wherein said improvement comprises pressure reference pump means to supply pressure reference fluid between said first compensator means and said pressure reference means and said second compensator means and said pressure reference means to alleviate pressure fluctuations.

6. A method to improve operation of a multiple high pressure fluid intensifier system which comprises:

a. first and second intensifier units, each comprising a piston assembly that in turn comprises a main piston and two high-pressure pistons, each piston assembly being mounted for reciprocating motion to cause the two high-pressure pistons to alternately deliver high pressure output fluid through output means of the intensifier unit;

b. first and second pump means operatively connected to said first and second intensifier units, respectively, to deliver pumping fluid to said first and second intensifier units, respectively;

c. first and second control valve means to control the flow of pumping fluid to the first and second intensifier units, respectively, to cause said piston assemblies of the first and second intensifier units to reciprocate;

d. first and second compensator means operatively connected to said first and second pump means, respectively, each of said compensator means being responsive to a reference pressure and also responsive to pressure of its related pump means, to cause its related pump means to increase or decrease volumetric flow from its pump means in response to a difference between said reference pressure and said pump pressure;

e. attenuator output means adapted to receive pressurized fluid from said first and second intensifier units in a manner to provide a fluid back pressure to said intensifier units;

f. pressure reference means to provide said reference pressure for said first and second attenuator means;

g. said intensifier system being characterized in that the piston assemblies of said first and second intensifier units experience a back pressure from said attenuator output means that is reacted back to said first and second pumps, and the piston assemblies experience a drop in pressure in transitioning from an end of one stroke and into a start of another stroke;

said method comprising maintaining pressure reference inputs to said first and second compensator means at an adequately high level relative to operating pressures of said first and second pump means in a manner that said first and second compensator means responds to pressure differentials between said reference pressure inputs and pump pressures of said first and second pump means, to cause the first and second pump means to operate at higher volumetric flow rates during periods of the piston assemblies of the first and second intensifier units reaching an end of stroke position and entering into a subsequent stroke.

7. The method as recited in claim 6, wherein said method comprises positioning first and second check valve means operatively between said pressure reference means and said first compensator means and between said pressure reference means and said second compensator means, respectively, permitting flow from the first and second compensator means, respectively, toward said pressure reference means, and preventing flow in an opposite direction, so as to isolate each of said compensator means from pressure drops of the pump means operatively connected to the other compensator means.

8. The method as recited in claim 7, wherein the method comprises positioning first and second adjustable needle valve means operatively between said first compensator means and said pressure reference means and between said second compensator means and said pressure reference means, respectively, and selectively adjusting said first and second needle valve means to control flow from said first and second compensator means, respectively, toward said pressure reference means.

9. The method as recited in claim 6, wherein said method comprises operatively connecting accumulator means to hydraulic line means interconnecting said first compensator means and said pressure reference means and also interconnecting said second compensator means with said pressure reference means, and utilizing said accumulator means to reduce pressure fluctuations between said first compensator means and said pressure reference means and said second compensator means and said pressure reference means.

10. The method as recited claim 6, wherein said method comprises pressure reference pump means to supply pressure reference fluid between said first compensator means and said pressure reference means and said second compensator means and said pressure reference means to alleviate pressure fluctuations to alleviate pressure variations.

* * * * *